US010966288B2

(12) United States Patent
Nagatomo et al.

(10) Patent No.: US 10,966,288 B2
(45) Date of Patent: Mar. 30, 2021

(54) SIC HEATER

(71) Applicant: SUMITOMO OSAKA CEMENT CO., LTD., Tokyo (JP)

(72) Inventors: Hiroaki Nagatomo, Tokyo (JP); Yuki Uchikawa, Tokyo (JP); Yoshihiko Murakami, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 142 days.

(21) Appl. No.: 16/322,425

(22) PCT Filed: Aug. 2, 2017

(86) PCT No.: PCT/JP2017/028028
§ 371 (c)(1),
(2) Date: Jan. 31, 2019

(87) PCT Pub. No.: WO2018/025911
PCT Pub. Date: Feb. 8, 2018

(65) Prior Publication Data
US 2019/0174578 A1  Jun. 6, 2019

(30) Foreign Application Priority Data

Aug. 2, 2016 (JP) .............................. JP2016-151911

(51) Int. Cl.
*H05B 3/14* (2006.01)
*H05B 3/20* (2006.01)
(Continued)

(52) U.S. Cl.
CPC ............. *H05B 3/148* (2013.01); *C03C 3/083* (2013.01); *C03C 3/089* (2013.01); *C03C 3/091* (2013.01);
(Continued)

(58) Field of Classification Search
CPC . H05B 3/148; H05B 3/14; H05B 3/12; H05B 3/03; H05B 3/06; H05B 3/20;
(Continued)

(56) References Cited

U.S. PATENT DOCUMENTS 4,713,530 A  12/1987 Schittenhelm et al.

FOREIGN PATENT DOCUMENTS

JP  60-143585   *  7/1985
JP  60-143585 A    7/1985
(Continued)

OTHER PUBLICATIONS

International Search Report for PCT/JP2017/028028 (dated Oct. 31, 2017).

*Primary Examiner* — Shawntina T Fuqua
(74) *Attorney, Agent, or Firm* — Merchant & Gould P.C.

(57) ABSTRACT

This SiC heater includes a heating element having a thin plate-shaped silicon carbide sintered body and an insulating coat film formed on a surface of the silicon carbide sintered body, a pair of electrodes for conducting electricity in the heating element, and a heater base that holds the heating element from one surface side while insulating the heating element from heat from the heating element, the insulating coat film is located on a surface of the silicon carbide sintered body opposite to the heater base, an electrical resistivity at room temperature of the insulating coat film is $10^9$ Ω·cm or more, a thermal expansion coefficient of the insulating coat film is $2 \times 10^{-6}$/K or more and $6 \times 10^{-6}$/K or less, $SiO_2$ is included as a matrix, 1% by weight or more and 35% by weight or less of a first additive component including at least one of $B_2O_3$ and $Al_2O_3$ is contained, and 1% by weight or more and 35% by weight or less of a second additive component including at least one of MgO and CaO is contained.

20 Claims, 4 Drawing Sheets

(51) Int. Cl.
   *C04B 35/575* (2006.01)
   *C03C 8/16* (2006.01)
   *H05B 3/12* (2006.01)
   *C03C 3/091* (2006.01)
   *C03C 3/089* (2006.01)
   *C03C 3/083* (2006.01)
   *H05B 3/03* (2006.01)
   *H05B 3/06* (2006.01)

(52) U.S. Cl.
   CPC .............. *C03C 8/16* (2013.01); *C04B 35/575* (2013.01); *H05B 3/03* (2013.01); *H05B 3/06* (2013.01); *H05B 3/12* (2013.01); *H05B 3/14* (2013.01); *H05B 3/20* (2013.01); *C04B 2235/383* (2013.01); *C04B 2235/3826* (2013.01); *C04B 2235/5409* (2013.01); *C04B 2235/5445* (2013.01); *C04B 2235/5454* (2013.01); *C04B 2235/5472* (2013.01); *C04B 2235/77* (2013.01); *C04B 2235/9607* (2013.01)

(58) Field of Classification Search
   CPC . C04B 35/575; C04B 35/565; C04B 2235/77; C04B 2235/3826; C04B 2235/5445; C04B 2235/5472; C04B 2235/9607; C04B 2235/5454; C04B 2235/383; C04B 2235/5409; C04B 41/87; C03C 8/16; C03C 3/091; C03C 3/083; C03C 3/089; C03C 3/087
   See application file for complete search history.

(56) References Cited

FOREIGN PATENT DOCUMENTS

| | | | |
|---|---|---|---|
| JP | 62-093884 | A | 4/1987 |
| JP | 06-104072 | A | 4/1994 |
| JP | 2002-025751 | * | 1/2002 |
| JP | 2002-025751 | A | 1/2002 |
| JP | 3710690 | B | 10/2005 |

* cited by examiner

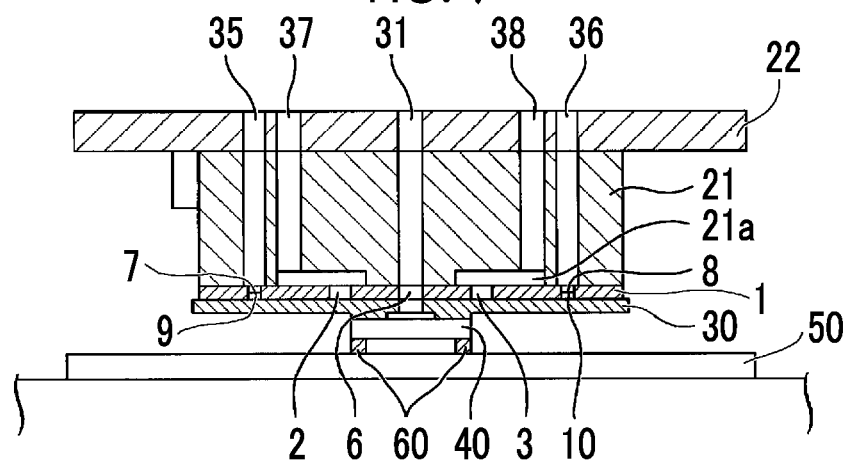
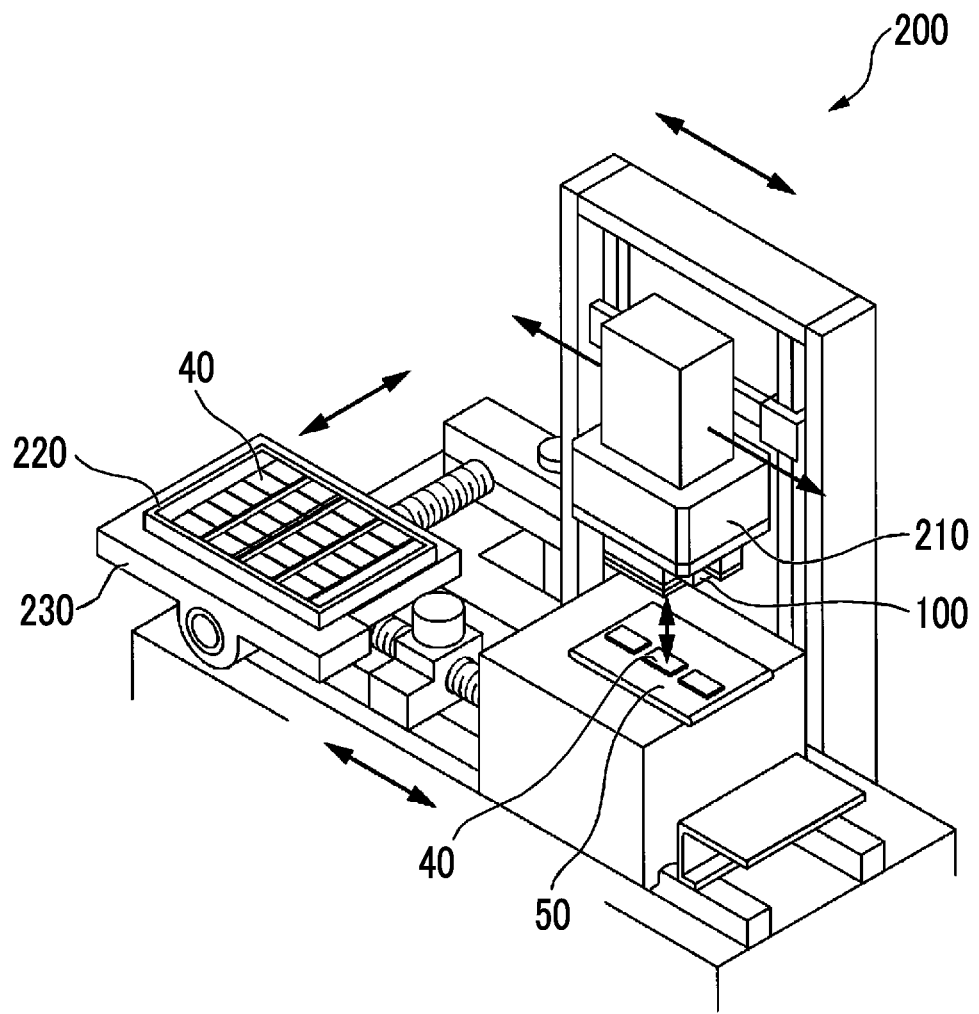

SIC HEATER

TECHNICAL FIELD

The present invention relates to a SIC heater.

This application is a U.S. National Stage Application under 35 U.S.C. § 371 of International Patent Application No. PCT/JP2017/028028, filed on Aug. 2, 2017, which claims the benefit of priority to Japanese Patent Application No. 2016-151911, filed in Japan on Aug. 2, 2016, the disclosures of all of which are hereby incorporated by reference in their entireties. The International Application was published in Japanese on Feb. 8, 2018 as WO 2018/025911.

BACKGROUND

In recent years, development for high integration such as 2.5D and 3D mounting has been accelerating mainly in the fields of smartphones, mobile phones, tablet terminals, and the like. In the mounting of a System-on-a-Chip (SoC) such as a memory or an application processor, mounting by reflow in which a plurality of devices is thermally treated collectively and continuously is mainstreamed. However, in mounting by reflow, there is a limitation on a decrease in the sizes of bumps and gaps, and higher level of integration is difficult. Therefore, a mounting method called a thermal compression method has drawn attention as a technique replacing reflow and has been put into practical use in some fields.

The thermal compression method refers to a method in which each and every chip is heated and cooled under the application of a load using a heater including a heating element and mounted. It is known that the use of a ceramic heating element as the heating element of the heater that realizes the thermal compression method suppresses the deformation of the heating element when a load is applied thereto and enables high-precision mounting. Therefore, it is expected that, in the future, the thermal compression method using a ceramic heater in which ceramic is used for the heating element will become a mainstream mounting method.

As the ceramic heater, a SiC heater in which silicon carbide is used for the heating element is described in Patent Literature 1. In this SiC heater, an insulating coat film made of borosilicate glass or aluminosilicate glass is provided on the surface of the heating element made of silicon carbide.

CITATION LIST

Patent Literature

[Patent Literature No. 1] Japanese Patent No. 3710690

SUMMARY OF INVENTION

Technical Problem

When the SiC heater described in Patent Literature 1 undergoes a heat history of a high temperature of 700° C. or higher, there is a case in which the insulating coat film becomes white-turbid and the insulation characteristics significantly degrade. Generally, the heating temperature of a work during mounting is approximately 450° C., but the work is desirably capable of withstanding a certain degree of a high temperature in preparation for an excessive increase in temperature that is not planned.

The present invention has been made in consideration of the above-described problem with the silicon carbide heater of the related art, and an object of the present invention is to provide a SiC heater in which the degradation of the insulation property caused by an excessive increase in temperature is suppressed.

Solution to Problem

In order to solve the above-described problem, a SiC heater of an aspect of the present invention includes a heating element including a thin plate-shaped silicon carbide sintered body and an insulating coat film formed on a surface of the silicon carbide sintered body, a pair of electrodes for conducting electricity in the heating element, and a heater base that holds the heating element from one surface side while blocking the heat from the heating element, the insulating coat film is located on a surface of the silicon carbide sintered body, the surface being on the reverse side of the heater base-side surface, and made of at least one of borosilicate glass or aluminosilicate glass, an electrical resistivity at room temperature is $10^9$ Ω·cm or more, a thermal expansion coefficient is $2\times10^{-6}$/K or more and $6\times10^{-6}$/K or less, $SiO_2$ is used as a matrix, 1% by weight or more and 35% by weight or less of a first additive component including any one or both of $B_2O_3$ and $Al_2O_3$ is contained, and 1% by weight or more and 35% by weight or less of a second additive component including any one or both of MgO and CaO is contained.

That is, in order to solve the above-described problem, a SiC heater of an aspect of the present invention includes a heating element including a thin plate-shaped silicon carbide sintered body and an insulating coat film formed on a surface of the silicon carbide sintered body, a pair of electrodes for conducting electricity in the heating element, in which a heater base that holds the heating element from one surface side while blocking the heat from the heating element, the insulating coat film is located on a surface of the silicon carbide sintered body, the surface being on the reverse side of the heater base-side surface, an electrical resistivity at room temperature of the insulating coat film is $10^9$ Ω·cm or more, a thermal expansion coefficient of the insulating coat film is $2\times10^{-6}$/K or more and $6\times10^{-6}$/K or less, the insulating coat film includes $SiO_2$ as a matrix, contains 1% by weight or more and 35% by weight or less of a first additive component including at least one of $B_2O_3$ and $Al_2O_3$, and contains 1% by weight or more and 35% by weight or less of the total weight of a second additive component including at least one of MgO and CaO.

In the SiC heater, the second additive component may further include BaO.

In the SiC heater, the second additive component may include all of BaO, MgO, and CaO.

In the SiC heater, a total of contents of MgO and CaO of the second additive component may be equal to or more than and twice or less than a content of BaO.

In the SiC heater, a shape of the heating element may be a substantial S shape in a plan view having two slits notched from two facing sides of a substantially square shape or a substantially rectangular shape toward opposite sides respectively, and both end portions of the substantial S shape may be respectively connected to the pair of electrodes.

In the SiC heater, the insulating coat film is made of at least one of borosilicate glass or aluminosilicate glass.

In the SiC heater, a proportion of the first additive component may be 1% by weight or more and 30% by weight or less of a total weight of the insulating coat film.

In the SiC heater, a bonded body density of the silicon carbide sintered body may be 2.5 g/cm$^3$ or more, and an electrical resistivity at 25° C. may be 0.1 Ω·cm or more and 100 Ω·cm or less.

Advantageous Effects of Invention

According to the SiC heater of the present invention, the object is to provide a SiC heater in which the degradation of the insulation property caused by an excessive increase in temperature is suppressed.

BRIEF DESCRIPTION OF DRAWINGS

FIG. 9 is a side cross-sectional view seen in an inclined direction (a cross-sectional view along a C-C line illustrated in FIG. 4) illustrating the state of joining the semiconductor chip using the SiC heater according to the embodiment of the invention.

FIG. 10 is a perspective view illustrating a manufacturing state using a flip chip bonder in which the SiC heater according to the embodiment of the invention is used.

DESCRIPTION OF EMBODIMENTS

Hereinafter, an embodiment of the present invention will be specifically described.

However, this embodiment will be specifically described for better understanding of the gist of the invention and, unless particularly otherwise described, does not limit the invention contents. The modification, omission, addition, and other modifications of numerical values, locations, sizes, and the like are permitted within the scope of the gist of the present invention.

[SiC Heater]

Figure 1:
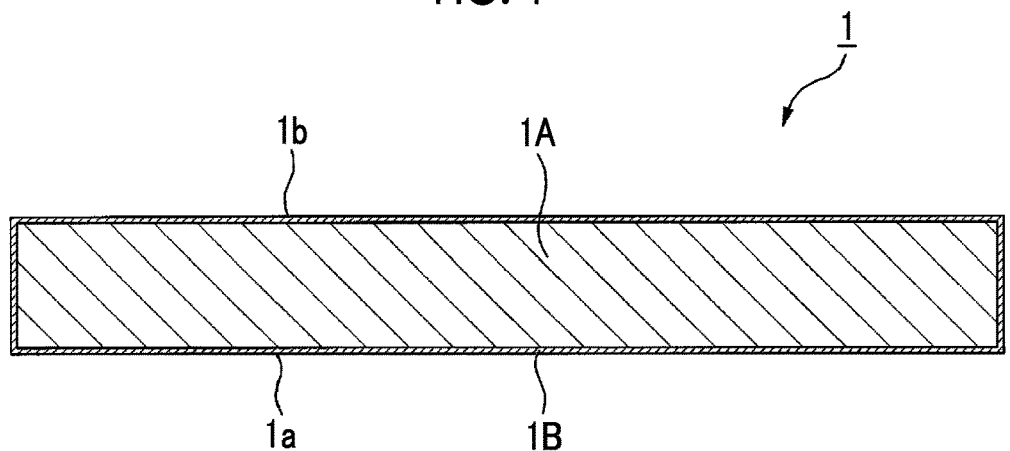
FIG. 1 is a cross-sectional view of a heating element of a SiC heater according to an embodiment of the present invention.
Figure 2:
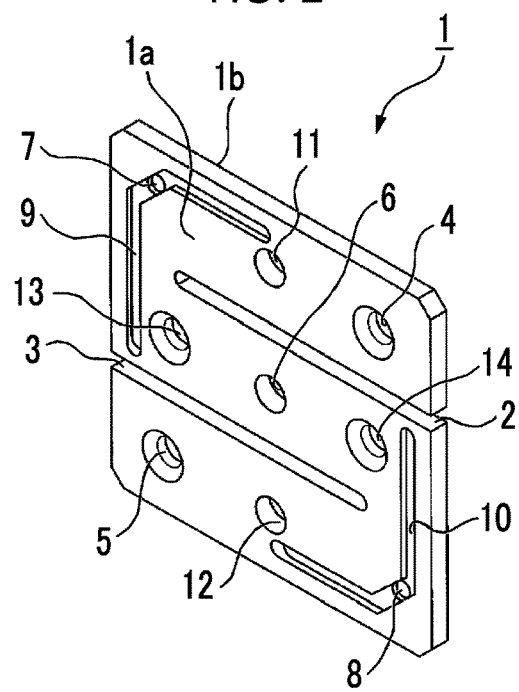
FIG. 2 is a perspective view of the heating element of the SiC heater according to the embodiment of the present invention.

FIG. 1 and FIG. 2 are respectively a cross-sectional view and a perspective view of a heating element 1 of a SiC heater 100 of the present embodiment. In addition, FIG. 3 to FIG. 6 are respectively a front view, a bottom plan view, a top plan view, and a side view of the SiC heater 100 of the present embodiment.

Figure 4:
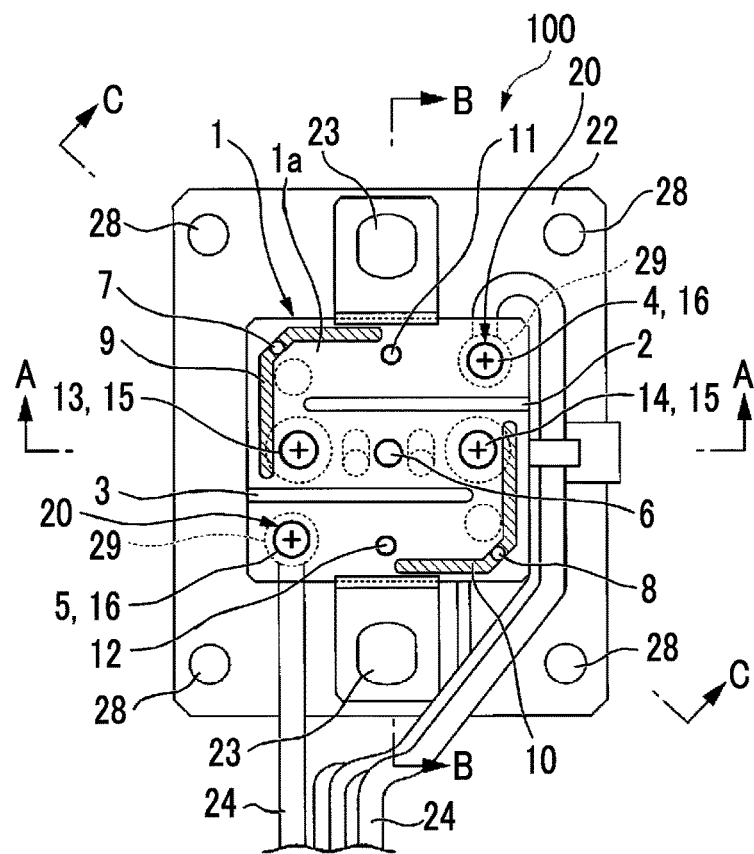
FIG. 4 is a bottom plan view illustrating the SiC heater according to the embodiment of the present invention.

As illustrated in FIG. 4, the SiC heater 100 of the present embodiment includes the heating element 1, a pair of electrodes 20 and 20, a heater base 21, and a cooling system connection member 22. The pair of electrodes 20 and 20 conduct electricity in the heating element 1. The heater base 21 blocks heat from the heating element 1 and holds the heating element 1 from one surface side. The cooling system connection member 22 supports the heater base 21. The electrode 20 has a lead wire 24 and a bolt 16 for fixing the lead wire 24 to the heating element 1.

Hereinafter, the respective portions will be specifically described.

[Heating Element]

As illustrated in FIG. 1, the heating element 1 has a thin plate-shaped silicon carbide sintered body 1A and an insulating coat film 1B formed on a surface of the silicon carbide sintered body.

As illustrated in FIG. 2, the heating element 1 is a thin plate having a substantially square shape or a substantially rectangular shape. In the present embodiment, the substantially square shape or the substantially rectangular shape is defined to have first and second sides which face each other and third and fourth sides which are connected with the first and second sides at corner portions and face each other. As an example, the heating element 1 is a thin plate having an external form of a 22 mm quadrilateral and a thickness of 1 mm. The heating element 1 has an suction surface 1a which is a surface to which a chip is suctioned and is located on a reverse side with respect to the heater base 21 and a rear surface 1b located on a heater base 21 side.

The heating element 1 has a substantial S shape in which two slits 2 and 3 notched from two facing sides (that is, the first side and the second side) toward opposite sides respectively (also referred to as a first slit 2 and a second slit 3). The two slits 2 and 3 are substantially parallel to each other and substantially perpendicular to the third and fourth sides. The length of the slits 2 and 3 is ⅔ of the length of the third and fourth sides. In addition, the electrodes 20 are respectively connected to the heating element 1 at both end portions (also referred to as a start point and an end point) of the substantial S shape. The slits 2 and 3 absorb influence of the thermal expansion and thermal shrinkage of the heating element 1 caused by temperature changes. Therefore, the provision of the slits 2 and 3 enables the heating element 1 to be resistant to thermal stress. Therefore, it becomes possible to form the heating element 1 having a thin plate thickness, consequently, the thermal capacity of the heating element 1 is decreased, and rapid heating and cooling become possible. Additionally, the slits 2 and 3 provide the heating element 1 with a substantial S shape, whereby an electric current flows through an S-shaped channel, and the temperature uniformity of the heating element 1 can be improved.

In the heating element 1, through-holes 4 and 5 for electrode attachment, a through-hole 6 that forms a gas passage for chip adsorption, through-holes 7 and 8 and grooves 9 and 10 that form a gas passage for heat exchanger plate adsorption, through-holes 11 and 12 that form a passage for inert gas, and through-holes 13 and 14 for insertion of flat head screws 15 and 15 that fix the heating element 1 to the heater base 21 are provided.

The through-holes for electrode attachment 4 and 5 are located at the respective front end portions (that is, the start point and the end point) of the substantial S shape of the heating element 1. The through-hole 6 is located at substantially a central portion of the heating element 1. In other words, the through-hole 6 is located at substantially a middle point of a straight line connecting the through-hole 4 and the through-hole 5. The through-holes 7 and 8 are located near the outer edges of corner portions facing the respective front end portions of the substantial S shape of the heating element 1. The grooves 9 and 10 are respectively communicated with the through-holes 7 and 8 on the adsorption surface 1a of the heating element 1 and formed in a substantially L shape along the outer edges. The through-hole 11 is located at a middle location between the through-hole 4 and the through-hole 7. The through-hole 12 is located at a middle location between the through-hole 5 and the through-hole 8.

The silicon carbide sintered body 1A of the heating element 1 is preferably silicon carbide, particularly, silicon carbide having a sintered body density of 2.5 g/cm$^3$ or more and more preferably silicon carbide having a sintered body density of 3.15 g/cm$^3$ or more. When the sintered body density of the silicon carbide sintered body 1A is set to 2.5 g/cm$^3$ or more, it is possible to sufficiently obtain a bonding force between silicon carbide particles. In addition, when the sintered body density of the silicon carbide sintered body 1A is set to 2.5 g/cm$^3$ or more, it is also possible to sufficiently ensure mechanical strength at a high temperature. Therefore, the breakage and plastic deformation at a high temperature of the heating element 1 caused by a load during bonding are suppressed, whereby surface precision of several micrometers can be easily obtained. Meanwhile, the theoretical density of silicon carbide is 3.21 g/cm$^3$. Therefore, the sintered body density of the silicon carbide sintered body 1A in the present embodiment is preferably 2.5 g/cm$^3$ or more and 3.21 g/cm$^3$ or less.

The thermal conductivity at room temperature of the silicon carbide sintered body 1A is preferably 100 W/m·K or more and more preferably 180 W/m·K or more. As described above, the sintering density of the silicon carbide sintered body 1A is as high as 2.5 g/cm$^3$ or more, and, furthermore, the silicon carbide sintered body can be sintered without addition of a sintering aid as described below, and thus only a small number of impurities are present in grain boundaries, a fine and uniform structure is obtained, and the thermal conductivity becomes as high as 100 W/m·K or more. The silicon carbide sintered body 1A becomes excellent in terms of temperature uniformity, there is no poor connection in bonded portions, the product yield becomes high, furthermore, the time necessary for cooling is short, the time taken for a single round of a bonding treatment is shortened, the cost performance enhances, and, additionally, there is no concern of thermal shock-induced breakage even during a rapid increase or decrease in temperature. The thermal conductivity at room temperature of the silicon carbide sintered body 1A is preferably higher; however, generally, 260 W/m·K or less.

The electrical resistivity at room temperature (25° C.) of the silicon carbide sintered body 1A is preferably 0.1 Ω·cm or more and 100 Ω·cm or less and more preferably 0.2 Ω·cm or more and 10.0 Ω·cm or less.

When the electrical resistivity of the silicon carbide sintered body 1A is set to 0.1 Ω·cm or more, it is possible to suppress the flow of a large electric current in the silicon carbide sintered body 1A. Therefore, it is possible to suppress the degradation of the location precision of a heater head by suppressing stress attributed to electromagnetic induction being generated in the lead wire 24 of the electrode 20. Additionally, when the electrical resistivity of the silicon carbide sintered body 1A is set to 0.1 Ω·cm or more, it becomes possible to sufficiently ensure the resistance value of the silicon carbide sintered body 1A without thinning the heating element 1, and it is possible to provide a strength great enough to withstand a pressure (generally, approximately 50 kg/cm$^2$) during bonding.

In addition, when the electrical resistivity of the silicon carbide sintered body 1A is set to 100 Ω·cm or less, it is possible to cause an electric current to flow without applying a large voltage, and a special power supply is not required, which is preferable.

The insulating coat film 1B of the heating element 1 is provided on at least a surface of the silicon carbide sintered body 1A opposite to the heater base 21 (the adsorption surface 1a). The insulating coat film 1B is made of at least one of borosilicate glass or aluminosilicate glass. Meanwhile, the insulating coat film 1B is preferably formed on not only the adsorption surface 1a but also the rear surface 1b and the side surfaces of the heating element 1.

The film thickness of the insulating coat film 1B is preferably set to 10 μm or more and 100 μm or less. In a case in which the film thickness of the insulating coat film 1B is less than 10 μm, the insulation characteristics as a heater significantly degrade, and, when the film thickness exceeds 100 μm, the insulating coat film 1B is likely to be peeled off from the silicon carbide sintered body 1A due to internal distortion with the SiC heater, which is not preferable. When the film thickness of the insulating coat film 1B is 10 μm or more, it is possible to ensure the insulation characteristics as a heater. In addition, when the insulating coat film 1B is set to 100 μm or less, the thermal capacity of the insulating coat film 1B is decreased, and it is possible to increase the thermal conductivity from the silicon carbide sintered body 1A to a work through the insulating coat film 1B, and thus it is possible to increase the response rate of the heater.

The electrical resistivity at room temperature of the insulating coat film 1B is preferably $10^9$ Ω·cm or more and more preferably $10^{10}$ Ω·cm or more. In such a case, it is possible to reliably ensure the insulation between the heating element 1 and a chip that is a work (heating subject) of the heating element 1.

The electrical resistivity at room temperature of the insulating coat film 1B is measured using an insulation resistance meter and, specifically, measured by applying a high voltage between a glass surface that coats the heater and the heater electrode.

The thermal expansion coefficient of the insulating coat film 1B is preferably 2×10$^{-6}$/K or more and 6×10$^{-6}$/K or less and more preferably 3.5/K or more and 5.5/K or less. The heating element 1 undergoes a number of times of repetition of rapid increase and decrease in temperature. Therefore, when the thermal expansion coefficient of the insulating coat film 1B is set to be close to the thermal expansion coefficient (approximately 4.5×10$^{-6}$/K) of the silicon carbide sintered body 1A that is the composition of the base of the heating element 1, it is possible to suppress the peeling of the insulating coat film 1B from the silicon carbide sintered body 1A.

The thermal expansion coefficient of the insulating coat film 1B is measured using a laser interferometer.

In the insulating coat film 1B, SiO$_2$ is used as the matrix. When SiO$_2$ is used as the matrix, the insulating coat film 1B is capable of ensuring a sufficient insulation property having the above-described electrical resistivity. Meanwhile, SiO$_2$ being used as the matrix means that, in the insulating coat film 1B, SiO$_2$ is a main component. The content of SiO$_2$ is preferably 30% by weight or more and 98% by weight or less and more preferably 46% by weight or more and 57% by weight or less of the total weight of the insulating coat film 1B.

The insulating coat film 1B contains a first additive component including at least one of B$_2$O$_3$ and Al$_2$O$_3$ in a content of 1% by weight or more and 35% by weight or less and preferably 15% by weight or more and 33% by weight or less of the total weight of the insulating coat film 1B. In other words, the insulating coat film 1B includes at least one of $B_2O_3$ and $Al_2O_3$, and the proportion of at least one of $B_2O_3$ and $Al_2O_3$ is 1% by weight or more and 35% by weight or less and preferably 15% by weight or more and 33% by weight or less of the total weight of the insulating coat film 1B.

Meanwhile, the proportion of $B_2O_3$ in the insulating coat film 1B is preferably 2% by weight or more and 15% by weight or less and more preferably 4% by weight or more and 13% by weight or less of the total weight of the insulating coat film 1B. The proportion of $Al_2O_3$ in the insulating coat film 1B is preferably 8% by weight or more and 25% by weight or less and more preferably 10% by weight or more and 22% by weight or less of the total weight of the insulating coat film 1B. In addition, the amount of $Al_2O_3$ is preferably set to be larger than the amount of $B_2O_3$ as necessary.

When the insulating coat film 1B includes 1% by weight or more of the first additive component that is at least one of $B_2O_3$ and $Al_2O_3$ of the total weight of the insulating coat film 1B, it is possible to enhance the thermal shock resistance and the abrasion resistance. Meanwhile, when the content of the first additive component exceeds 30% by weight of the total weight of the insulating coat film 1B, the toughness of the insulating coat film 1B is impaired, and the insulating coat film becomes brittle. Therefore, the content of the first additive component is preferably set to 30% by weight or less.

The insulating coat film 1B contains a second additive component that is at least one of MgO and CaO in a content of 1% by weight or more and 35% by weight or less and preferably 10% by weight or more and 33% by weight or less of the total weight of the insulating coat film 1B. In other words, the insulating coat film 1B includes at least one of MgO and CaO, and the proportion of at least one of MgO and CaO is 1% by weight or more and 35% by weight or less and preferably 10% by weight or more and 33% by weight or less of the total weight of the insulating coat film 1B. In addition, the second additive component is preferably at least one of MgO and CaO and, furthermore, BaO. In this case, the total proportion of at least one of BaO and MgO and CaO in the insulating coat film 1B is 1% by weight or more and 35% by weight or less and preferably 10% by weight or more and 33% by weight of the total weight of the insulating coat film 1B. Furthermore, the second additive component is more preferably BaO, MgO, and CaO. In this case, the total proportion of BaO, MgO, and CaO in the insulating coat film 1B is 1% by weight or more and 35% by weight or less and preferably 10% by weight or more and 33% by weight of the total weight of the insulating coat film 1B.

Meanwhile, the proportion of MgO in the insulating coat film 1B is preferably 2% by weight or more and 15% by weight or less and more preferably 3% by weight or more and 12% by weight or less as necessary.

The proportion of CaO in the insulating coat film 1B is preferably 1% by weight or more and 15% by weight or less and more preferably 3% by weight or more and 12% by weight or less as necessary.

When BaO is included in the insulating coat film 1B, the proportion of BaO in the insulating coat film 1B is preferably 3% by weight or more and 23% by weight or less and more preferably 4% by weight or more and 13% by weight or less as necessary.

When both MgO and CaO are included in the insulating coat film 1B, the amount of CaO is also preferably equal to or larger than the amount of MgO as necessary.

When both MgO and BaO are included in the insulating coat film 1B, the amount of BaO is also preferably larger than the amount of MgO as necessary.

When both CaO and BaO are included in the insulating coat film 1B, the amount of BaO is also preferably larger than the amount of CaO as necessary.

When BaO, MgO, and CaO that constitute the second additive component are included in the insulating coat film 1B, the thermal expansion coefficient of the insulating coat film 1B increases. The insulating coat film 1B made of at least one of borosilicate glass and aluminosilicate glass with SiO as the matrix has a lower thermal expansion coefficient than the silicon carbide sintered body 1A.

When at least one of BaO, MgO, and CaO is included in the insulating coat film 1B as the second additive component, it becomes possible to set the thermal expansion coefficient of the insulating coat film 1B to be close to the thermal expansion coefficient of the silicon carbide sintered body 1A. That is, the second additive component functions as a thermal expansion coefficient adjustment component.

The insulating coat film 1B contains 1% by weight or more and 35% by weight or less of the second additive component with respect to the total weight of the insulating coat film 1B, whereby it becomes possible to set the thermal expansion coefficient of the insulating coat film 1B to be close to the thermal expansion coefficient of the silicon carbide sintered body 1A. Meanwhile, in a case in which the content of the second additive component is less than 1% by weight of the total weight of the insulating coat film 1B, the thermal expansion coefficient of the insulating coat film 1B reaches less than $2 \times 10^{-6}$/K or more, and, in a case in which the content thereof exceeds 35% by weight, the thermal expansion coefficient of the insulating coat film 1B exceeds $6 \times 10^{-6}$/K.

MgO and CaO provide an effect of sufficiently increasing the melting point of the insulating coat film 1B. Therefore, when at least one of MgO and CaO is included in the insulating coat film 1B as the second additive component, it is possible to further increase the heatproof temperature of the heating element 1 by increasing the melting point of the insulating coat film 1B. Therefore, even in a case in which the temperature of the heating element 1 is increased more excessively than planned, it is possible to suppress the degradation of the insulation property. In addition, when the heatproof temperature of the heating element 1 is increased, it becomes possible to sufficiently increase the temperature of the heating element 1 to be higher than the target temperature of a heating subject in the heating of the work (heating subject) using the heating element 1. Therefore, it becomes possible to more rapidly heat the heating subject.

On the other hand, BaO does not have a sufficient effect of increasing the melting point of the insulating coat film 1B. Therefore, in a case in which the insulating coat film 1B includes neither MgO nor CaO and only includes BaO, the effect of sufficiently increasing the heatproof temperature of the heating element 1 is not sufficiently provided. However, BaO has an effect of making the insulating coat film 1B stickier compared to MgO and CaO. Therefore, when BaO is further added in addition to at least one of MgO and CaO as the second additive component, it is possible to form the insulating coat film 1B the peeling of which from the silicon carbide sintered body 1A is effectively suppressed. Furthermore, in a case in which BaO, MgO, and CaO are included as the second additive component, it is possible to enhance the thermal resistance as an insulating coat film, and it is possible to enhance the adhesiveness of the insulating coat film 1B to the silicon carbide sintered body 1A.

In the second additive component, the total of the contents of MgO and CaO is preferably equal to or more than and twice or less than the content of BaO. In such a case, it is possible to improve the adhesiveness of the insulating coat film 1B to the silicon carbide sintered body 1A in a well-balanced manner while enhancing the thermal resistance of the insulating coat film 1B.

[Electrodes]

The electrodes 20 have the lead wires 24 and bolts 16. The bolts 16 are inserted through the through-holes 4 and 5 located at the respective front end portions of the substantial S shape of the heating element 1 and fix the lead wires 24 to the heating element 1. Meanwhile, the electrodes 20 that are fixed to the heating element 1 are preferably disposed depending on the shape of the heating element 1 so that an electric current more uniformly flows throughout the entire range of the heating element 1.

[Heater Base]

The heater base 21 is located between the cooling system connection member 22 and the heating element 1. The heater base 21 holds the heating element 1 in a state in which the chip adsorption surface (the groove-incised surface) faces the lower end. The heater base 21 holds the heating element 1 using the flat head screws 15 and 15 that are respectively inserted into the through-holes 13 and 14 of the heating element 1.

The heater base 21 is made of a ceramic insulator having a high thermal insulation property and an excellent thermal shock resistance. As ceramic that is used for the heater base 21, silicon nitride ($Si_3N_4$), calcium silicate ($CaO.SiO_2$), sialon, and the like can be exemplified.

The heater base 21 holds the heating element 1 from one surface side and thus it is possible to suppress the escape of heat through the heater base 21 when the temperature of the heating element 1 is increased. Therefore, it becomes possible to rapidly increase the temperature of the heating element 1 with a small amount of power injected. In addition, the escape of heat to the cooling system connection member 22 to which the heater base 21 is attached also decreases, and thus it is possible to suppress the location deviation of the heater due to the thermal expansion of the cooling system connection member 22. Additionally, the heater base 21 mechanically reinforces the heating element 1 from one direction, and thus it is possible to suppress the heating element 1 being damaged by a load during bonding.

Figure 6:
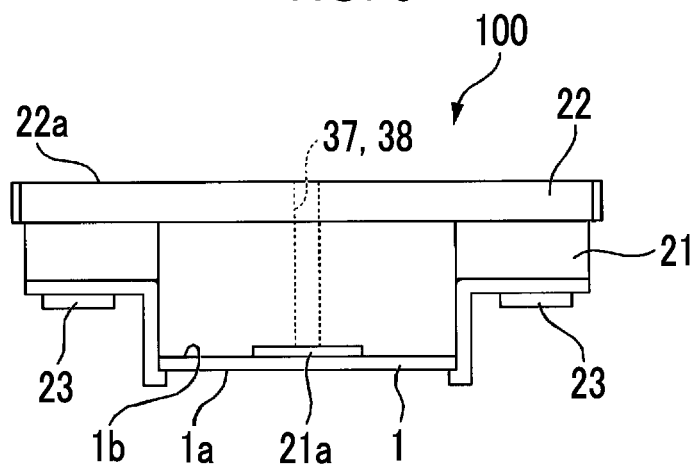
FIG. 6 is a side view illustrating the SiC heater according to the embodiment of the present invention.

As illustrated in FIG. 6, counterbore portions (also referred to as recess portions) 21a are provided on a surface of the heater base 21 which is in contact with the heating element 1. The counterbore portions 21a are provided in portions in which heat insulation is not required between the heating element 1 and the heater base 21. That is, the counterbore portions 21a are provided, whereby the heating element 1 and the heater base 21 are not in contact with each other in portions in which heat insulation is not required. In addition, in the counterbore portion 21a, a gap formed by the counterbore portion 21a functions as a passage of cooling gas.

[Cooling System Connection Member]

Figure 3:
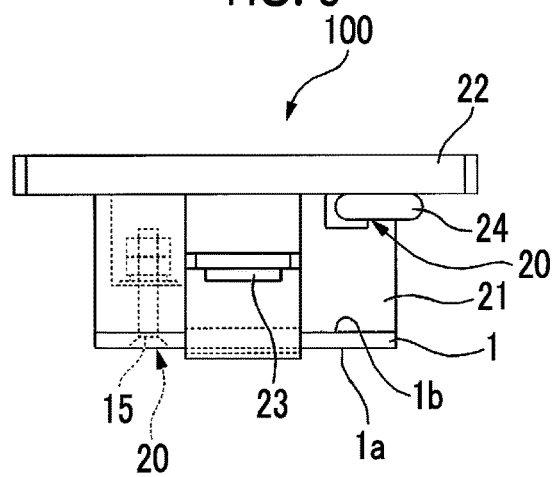
FIG. 3 is a front view illustrating the SiC heater according to the embodiment of the present invention.

As illustrated in FIG. 3, FIG. 4, and FIG. 6, the cooling system connection member 22 supports the heating element 1 through the heater base 21. The cooling system connection member 22 is fixed to the heater base 21 using a pair of bolts 23 and 23.

Figure 5:
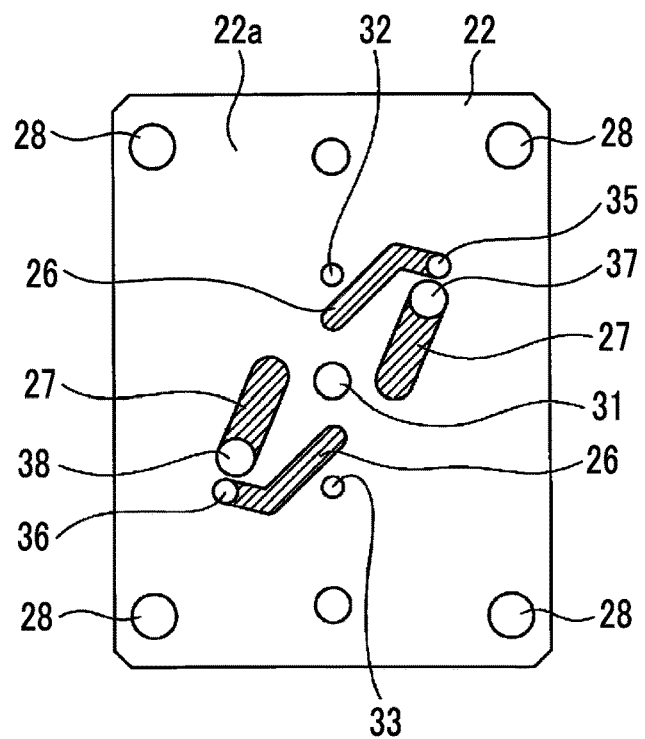
FIG. 5 is a top plan view illustrating the SiC heater according to the embodiment of the present invention.

As illustrated in FIG. 5, a surface of the cooling system connection member 22 opposite to the heater base 21 (a top surface 22a) is formed as a flat surface. The SiC heater 100 is fixed to a heater attachment portion of a bonding device such as a flip chip bonder or the like through the top surface 22a. In the top surface 22a, four through-holes 28, 28 for screwing the heater to the heater attachment portion are provided.

Figure 7:
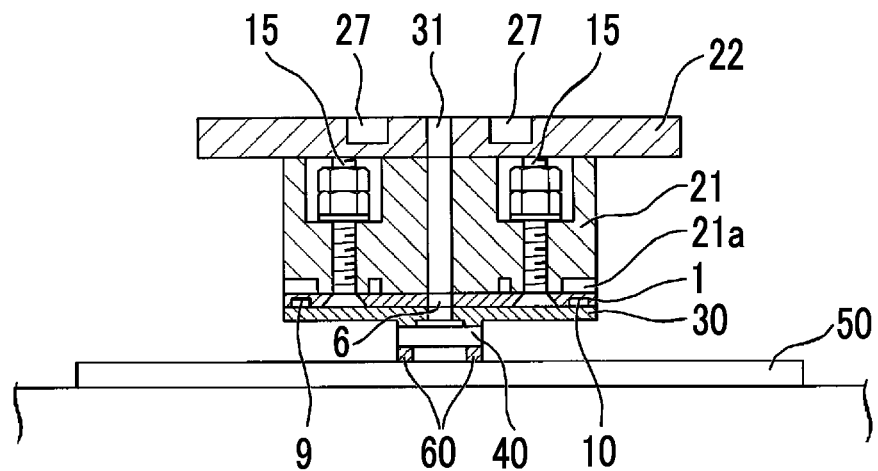
FIG. 7 is a front cross-sectional view (a cross-sectional view along an A-A line illustrated in FIG. 4) illustrating a state of joining a semiconductor chip using the SiC heater according to the embodiment of the present invention.
Figure 8:
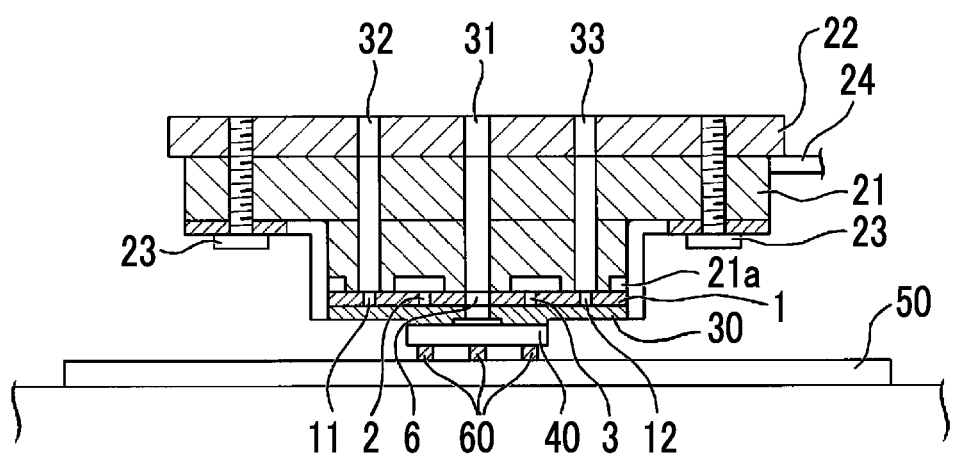
FIG. 8 is a side cross-sectional view (a cross-sectional view along a B-B line illustrated in FIG. 4) illustrating the state of joining the semiconductor chip using the SiC heater according to the embodiment of the invention.

FIG. 7 to FIG. 9 are views illustrating a state in which a semiconductor chip is joined using the SiC heater. FIG. 7 is a cross-sectional view along an A-A line in FIG. 4 which illustrates a state of joining a semiconductor chip using the SiC heater according to the embodiment of the present invention. FIG. 8 is a cross-sectional view along a B-B line in FIG. 4 which illustrates the state of joining the semiconductor chip using the SiC heater according to the embodiment of the present invention. FIG. 9 is a cross-sectional view along a C-C line in FIG. 4 which illustrates the state of joining the semiconductor chip using the SiC heater according to the embodiment of the present invention.

As illustrated in FIG. 7, in the cooling system connection member 22 and the heater base 21, a through-hole (through-hole for chip adsorption) 31 penetrating the heater base 21 and the cooling system connection member 22 is provided concentrically with the through-hole 6 in the heating element 1. A negative pressure generator (not illustrated) is connected to the through-hole 31, and a chip is adsorbed to the through-hole 6 in the heating element 1.

As illustrated in FIG. 8, in the cooling system connection member 22 and the heater base 21, through-holes (through-holes for supplying a variety of gases) 32 and 33 penetrating the heater base 21 and the cooling system connection member 22 are provided concentrically with the through-holes 11 and 12 in the heating element 1. The through-holes 32 and 33 serve as passages for a variety of gases such as nitrogen gas or the like being supplied in a case in which joining is carried out using the SiC heater 100 in an inert gas atmosphere.

As illustrated in FIG. 9, in the cooling system connection member 22 and the heater base 21, through-holes (through-holes for heat exchanger plate adsorption on the groove side) 35 and 36 penetrating the heater base 21 and the cooling system connection member 22 are provided concentrically with the through-holes 7 and 8 in the heating element 1. In addition, as illustrated in FIG. 5, a pair of grooves 26 are provided in the cooling system connection member 22. In addition, the through-holes 35 and 36 open upward in the pair of grooves 26. The through-holes 35 and 36 form gas passages for heat exchanger plate adsorption.

As illustrated in FIG. 9, in the cooling system connection member 22 and the heater base 21, through-holes 37 and 38 penetrating the heater base 21 and the cooling system connection member 22 are provided at locations communicating with the counterbore portions 21a in the heater base 21. In addition, as illustrated in FIG. 5, the cooling system connection member 22 is provided with a pair of grooves 27. In addition, the through-holes 37 and 38 open upward in the pair of grooves 27. The through-holes 37 and 38 form gas supply passages that supply a cooling gas that rapidly cools the heating element 1 to the counterbore portions 21a. The cooling gas supplied from the through-holes 37 and 38 passes through the counterbore portions 21a formed on the surface of the heater base 21 on the heating element 1 side, cools the rear surface of the heating element 1, and then escapes outside from side surfaces of the heater base 21. In addition, the cooling gas supplied from the through-holes 37 and 38 passes through the slits 2 and 3 through the counterbore portions 21a, cools the heating element 1, and then escapes from the side surfaces of the heating element 1.

As described above, gaps are provided between the heating element 1 and the heater base 21 by forming the counterbore portions 21a on the surface of the heater base 21 on the heating element 1 side, and the slits 2 and 3 are formed in the heating element 1, whereby the counterbore portions 21a increase the area of the gaps between the heating element 1 and the heater base 21 with which the cooling gas comes into contact during cooling using a cooling gas, and the cooling efficiency can be increased. Furthermore, the slits 2 and 3 in the heating element 1 are communicated with the counterbore portions 21a, whereby the cooling gas also passes through the slits 2 and 3, the cooling rate can be increased, and rapid cooling becomes possible.

[Method for Manufacturing Heating Element]

Next, a method for manufacturing the heating element 1 will be described.

The heating element 1 of the present embodiment has the silicon carbide sintered body 1A having a sintered body density of 2.5 g/cm$^3$ or more and an electrical resistivity of 0.1 to 100 Ω·cm. The silicon carbide sintered body 1A is obtained using a method in which a first silicon carbide powder having an average grain diameter of 0.1 to 10 μm and a second silicon carbide powder of 0.1 μm or less are mixed together and the mixture is sintered. According to this method, it is easy to obtain silicon carbide exhibiting an electrical resistivity in a range of 0.1 to 100 Ω·cm. The above-described method for manufacturing the silicon carbide sintered body 1A is disclosed by Japanese Laid-open Patent Publication No. 4-65361; however, in this embodiment, it is desirable to use silicon carbide having an electrical resistivity that is as large as 0.1 to 100 Ω·cm.

In order to manufacture the silicon carbide sintered body 1A having the above-described characteristics, first, the first silicon carbide powder having an average grain diameter of 0.1 to 10 μm and the second silicon carbide fine powder having an average grain diameter of 0.1 μm or less are prepared. The average grain diameters of the first and second silicon carbide powders are obtained using a laser diffraction-type particle size distribution measurement instrument.

The first silicon carbide powder may be an ordinarily-used silicon carbide powder, and, for example, a silicon carbide powder manufactured using a method such as the silica reduction method, the Acheson method, or the like is used. The crystal phase of the first silicon carbide powder may be any of amorphous, an α type and a β type, but an α-type silicon carbide powder is preferred due to the ease of adjusting the electrical resistivity to 0.1 to 100 Ω·cm.

As the second silicon carbide powder, a silicon carbide powder obtained by introducing a raw material gas including a silane compound or a silicon halide and hydrocarbon to the plasma of a non-oxidative atmosphere and causing a gas-phase reaction while controlling the pressure of the reaction system in a range of from lower than 1 atmosphere to 0.1 torr (meanwhile, 1 torr=133.3 Pa) is used. The crystal phase of the second silicon carbide powder may be any of amorphous, an α type and a β type. The second silicon carbide powder obtained in the above-described manner has an extremely excellent sinterability, and thus it is possible to obtain a highly pure and dense silicon carbide sintered body 1A only by mixing the second silicon carbide power with the first silicon carbide powder without adding a sintering aid.

Next, the first silicon carbide powder and the second silicon carbide powder are mixed together, thereby producing a mixture. The mixing ratio is obtained in advance by a preliminary test so that a silicon carbide sintered body to be obtained has a predetermined electrical resistivity value (0.1 to 100 Ω·cm). After that, the mixture is shaped to a desired shape, the obtained compact is sintered at a temperature of 1,800° C. to 2,400° C. to obtain a sintered body, and the sintered body is used as the silicon carbide sintered body 1A. Neither the sintering method nor the atmosphere during sintering are limited, and examples thereof include a sintering method in which the compact is sintered in a non-oxidative atmosphere using a hot press furnace or the like.

Next, the insulating coat film 1B is formed on the surface of the silicon carbide sintered body 1A.

The insulating coat film 1B is formed using the following method. First, the surface of the worked silicon carbide sintered body 1A is ultrasonic-cleaned with acetone and then naturally dried. After that, a thermal treatment is carried out in an oxidation furnace, for example, at a temperature of 1,000° C. for 70 hours, thereby generating a sufficient oxidized film.

Next, a glass powder having a desired glass composition, the first and second additive components, and a screen oil are mixed together, thereby forming a slurry. The desired glass composition of the glass powder is specifically, for example, high-purity (3N or higher) silicon oxide glass. Regarding the compositional ratios when the glass powder and the first and second additive components are mixed together, the content of silicon oxide is 44% to 60% by weight, the content of the first additive component is 1% to 35% by weight, and the content of the second additive component is 1% to 35% by weight with respect to the total weight of the glass powder and the first and second additive components. Regarding a preferred compositional ratios when the glass powder and the first and second additive components are mixed together, the content of silicon oxide is 46% to 57% by weight, the content of the first additive component is 5% to 25% by weight, and the content of the second additive component is 5% to 20% by weight with respect to the total weight of the glass powder and the first and second additive components.

Next, the slurry-form glass is applied to the surface (the adsorption surface 1a) opposite to the surface (the rear surface 1b) in contact with the heater base and the side surfaces of the silicon carbide sintered body 1A and dried in a dryer, for example, at 100° C. for one hour.

Next, the slurry-form glass is heated in an oxidation furnace, for example, at 1,050° C. for 20 minutes to fuse the glass to the silicon carbide sintered body 1A, thereby forming the insulating coat film 1B. Furthermore, as a finishing step, the surface of the formed insulating coat film 1B is ground, thereby setting the parallelism of the top and bottom surfaces (the adsorption surface 1a and the rear surface 1b) of the heating element 1 to, for example, 3 μm or less respectively.

The parallelism of the top and bottom surfaces of the heating element 1 are computed by measuring nine points using a dial gauge.

[Method for Bonding Semiconductor Chip]

FIG. 10 is a perspective view illustrating a manufacturing state using a flip chip bonder in which the SiC heater according to the embodiment of the invention is used. A method for bonding a semiconductor chip using the SiC heater 100 of the present embodiment will be described on the basis of FIG. 10.

As illustrated in FIG. 10, the SiC heater 100 is attached to a lower end portion of a movable platform 210 of a flip chip bonder 200 and used to manufacture a semiconductor-mounted board.

First, the SiC heater 100 moves the movable platform 210 to a location of an auto loader 230 on which a tray 220 in which a plurality of semiconductor chips 40 is placed is mounted and suctions the air through the through-hole 6, thereby adsorbing one semiconductor chip 40 from the tray 220.

Next, the movable platform 210 is moved to a location at which a substrate 50 is prepared, and the semiconductor chip 40 is put on a conductive bonding material 60 that has been mounted in advance on the substrate 50 illustrated in FIG. 7 to FIG. 9. Furthermore, a welding pressure is applied downward using the movable platform 210, and electricity is conducted in the SiC heater 100 to cause the heating element 1 to generate heat, thereby approximately evenly increasing the temperatures of the semiconductor chip 40, the conductive bonding material 60, and the substrate 50 through a heat exchanger plate 30. Therefore, the conductive bonding material 60 is melted within several seconds, and the substrate 50 and the semiconductor chip 40 are joined together through the molten conductive bonding material 60.

Meanwhile, in a case in which bonding is carried out in an inert gas atmosphere, the substrate and the semiconductor chip are joined together while blowing an inert gas supplied from the through-holes 32 and 33 to the conductive bonding material disposed.

After the joining between the substrate 50 and the semiconductor chip 40 is completed, the compressed air is supplied to the counterbore portions 21a through the through-holes 37 and 38. The compressed air flows out to the outside of the SiC heater 100 through the slits 2 and 3 from the rear surface 1b side of the heating element 1. The heating element 1 is rapidly cooled by the compressed air. Once the conductive bonding material 60 is cooled and solidified, the adsorption of the semiconductor chip 40 is released, and the movable platform 210 is moved upward. Cooling that supplies a high-pressure compressed gas such as the compressed air or the like enables the rapid cooling of the heating element 1 within several seconds, and thus the semiconductor chip 40 and the substrate 50 are protected from overheating, and the bonding treatment time per cycle can be shortened.

Next, the movable platform 210 is moved to the location of the auto loader 230, newly adsorbs a semiconductor chip 40, and continues to carry out flip chip bonding on the subsequent substrate 50.

The heat exchanger plate 30 used to manufacture this semiconductor chip-mounted board is a member that is used to uniformly transfer heat from the heating element 1 to the semiconductor chip 40, the conductive bonding material 60, and the substrate 50. Therefore, the heat exchanger plate 30 needs to be excellent in terms of a heat transfer property, thermal resistance, and a thermal shock property. The heat exchanger plate 30 is preferably made of ceramic, for example, aluminum nitride (AlN) or the like. As the conductive bonding material 60, a solder bump, a metal bump, and the like are exemplified. The bonding material has properties of being melted by heating and being solidified by cooling.

The heating element 1 preferably has a small thermal capacity in order to rapidly increase and decrease the temperature of the heating element. Therefore, the thickness of the heating element 1 is preferably approximately 0.5 to 1.5 mm and more preferably 0.8 to 1.2 mm in order to decrease the thermal capacity while maintaining a mechanical strength as the heating element 1.

A method for joining using the SiC heater of the present embodiment is rapid heating in which the semiconductor chip 40, the conductive bonding material 60, and the substrate 50 are heated and pressurized using heat from the heating element 1 and the conductive bonding material 60 is melted within several seconds. Therefore, the overheating of the semiconductor chip 40 and the substrate 50 can be suppressed.

Hitherto, the embodiment of the present invention has been described, but the respective constitutions, combinations thereof, and the like in the embodiment are examples, and the addition, omission, substitution, and other modifications of the constitutions are possible within the scope of the gist of the present invention. In addition, the present invention is not limited by the embodiment.

EXAMPLES

Hereinafter, the present invention will be described using examples, but the present invention is not limited to these examples.

[Production of Specimen]

A heating element of a SiC heater was manufactured in the following manner.

First, silicon tetrachloride and ethylene were used as raw material gases, and an amorphous silicon carbide ultrafine powder having an average grain diameter of 0.01 μm and a BET specific surface area of 96 m$^2$/g was obtained using a plasma CVD method.

This silicon carbide ultrafine powder (5% by weight) and a commercially available α-type silicon carbide powder (having an average grain diameter of 0.7 μm and a BET specific surface area of 13 m$^2$/g) (95% by weight) were dispersed in methanol and, furthermore, mixed together for 12 hours using a ball mill. Next, this mixture was dried, shaped, and sintered by hot pressing.

Meanwhile, the average grain diameters of the amorphous silicon carbide ultrafine powder and the α-type silicon carbide powder were measured using a laser diffraction particle size analyzer SALD-2300 (manufactured by Shimadzu Corporation).

The BET specific surface areas of the amorphous silicon carbide ultrafine powder and the α-type silicon carbide powder were measured by a gas adsorption method using a BET specific surface area measurement instrument BEL-SORP-miniII (manufactured by MicrotracBEL0 Corp.).

The sintering conditions were an argon atmosphere, a sintering temperature of 2,200° C., a pressing pressure of 39.23 MPa (400 kgf/cm$^2$), and 90 minutes. A silicon carbide sintered body having a density of the sintered body of $3.1 \times 10^3$ kg/m$^3$, an electrical resistivity at room temperature of 0.3 Ω·cm (the four-terminal method), and a thermal conductivity at room temperature of 230 W/mK (the laser flash method) was obtained.

Regarding the density of the sintered body, the true density (d0) of the sintered body was measured using the Archimedes method, the ratio (d0/dt) of the true density (d0) to the theoretical density (dt) was expressed as a percentage, and a relative density (%) was obtained.

The electrical resistivity at room temperature of the sintered body was measured by the four-terminal method using Loresta-GX (manufactured by Mitsubishi Chemical Analytec Co., Ltd.), and, specifically, the electrical resistivity was radially measured from the surface-polished disc plate of the sintered body surface at 45° and intervals of 10 cm.

The thermal conductivity at room temperature of the sintered body was measured using the laser flash method, and, specifically, a ϕ10×3t piece was cut out from the sintered body, the surface was irradiated with a laser light, and the temperature of the rear surface was measured using a radiation thermometer, thereby computing the thermal conductivity (the laser flash method specified by Japanese Industrial Standards JIS R1611 "Measurement methods of thermal diffusivity, specific thermal capacity, and thermal conductivity for fine ceramics by flash method").

Next, the silicon carbide sintered body was worked, thereby obtaining a thin plate of the silicon carbide sintered body having a through-hole for semiconductor chip adsorption 6 having a diameter of 2 mm, through-holes for heat exchanger plate adsorption 7 and 8, and 1 mm-wide slits 2 and 3 extending from an outer edge portion to the inside as illustrated in FIG. 2. The size of a heater surface of the thin plate was 22×22 mm, and the thickness t was 1.0 mm. Furthermore, in the thin plate, through-holes 13 and 14 for screwing the thin plate to a heater base 21 and through-holes 4 and 5 for electrode attachment were formed. Meanwhile, the through-hole for semiconductor chip adsorption 6, the through-holes for heat exchanger plate adsorption 7 and 8, and through-holes for heat exchanger plate separation 11 and 12 are respectively provided by drilling concentrically with the through-holes 31, 32, 33, 35, and 36 that are provided by drilling in the heater base 21.

Next, a surface treatment that formed an insulating coat film on a surface of the thin plate made of the silicon carbide sintered body produced through the above-described steps was carried out. Hereinafter, an order of forming the insulating coat film will be more specifically described.

First, the surface of the thin plate made of the silicon carbide sintered body was ultrasonic-cleaned with acetone and then naturally dried. After that, a thermal treatment was carried out in an oxidation furnace at a temperature of 1,000° C. for 70 hours, thereby generating a sufficient oxidized film.

Next, a glass powder and individual additive components, and a screen oil were put into an agate mortar and mixed together in a ratio of 3:2 so as to obtain a compositional ratio of each of Comparative Example 1 and Example 1 to Example 7 as shown in Table 1 below, thereby producing a slurry.

Next, the slurry-form glass was uniformly applied to the surfaces of the silicon carbide sintered body in a thickness of approximately 200 μm, was dried in a dryer at a temperature of 100° C. for one hour, and then heated in the oxidation furnace, thereby fusing the insulating coat film to the surface of the silicon carbide sintered body. Meanwhile, regarding heating times and heating temperatures in the oxidation furnace, the heating was carried out at a temperature of 950° C. for 20 minutes in Comparative Example 1, and the heating was carried out at 1,050° C. for 20 minutes in Example 1 to Example 7.

Finally, the glass surface was ground, thereby finishing the parallelism of a heating element to 3 μm or less respectively. Meanwhile, the film thickness of the obtained insulating coat film was 50 μm.

The parallelism of the glass surface was computed by measuring the thickness of the heating element at nine points using a dial gauge.

TABLE 1

| Specimen | Compositional ratio (% by weight) | | | | | |
|---|---|---|---|---|---|---|
| | $SiO_2$ | $Al_2O_3$ | $B_2O_3$ | BaO | MgO | CaO |
| Comparative Example 1 | 46 | 14 | 13 | 27 | — | — |

TABLE 1-continued

| Specimen | Compositional ratio (% by weight) | | | | | |
|---|---|---|---|---|---|---|
| | $SiO_2$ | $Al_2O_3$ | $B_2O_3$ | BaO | MgO | CaO |
| Example 1 | 51 | 18 | 4 | 11 | 7.5 | 8.5 |
| Example 2 | 50 | 10 | 8 | 15 | 8 | 9 |
| Example 3 | 57 | 22 | 10 | 5 | 3 | 3 |
| Example 4 | 52 | 18 | 11 | 11 | 8 | — |
| Example 5 | 52 | 18 | 11 | 11 | — | 8 |
| Example 6 | 52 | 16 | 10 | — | 10 | 12 |
| Example 7 | 46 | 14 | 13 | 20 | 3 | 4 |

Next, as illustrated in FIG. 7 to FIG. 9, a silicon nitride sintered body was overlaid on a top surface (a rear surface 1b) of the heating element as the heater base 21. Meanwhile, the heater base 21 includes through-holes 37 and 38 for cooling the heating element. Furthermore, M1.4 bolts were inserted into the through-holes for fastening 13 and 14, thereby screwing the heater base 21 and the heating element. In addition, an M1.4 flat head screw was inserted into an electrode attachment hole 29, an end portion of a lead wire was fixed to a vicinity of a front end of the screw using a nut to form an electrode 20, and, consequently, a SiC heater of each of Comparative Example 1 and Example 1 to Example 7 was obtained.

[Evaluation]

Next, insulation property experiments before and after an excessive increase in temperature and adhesiveness evaluations after a heat cycle were carried out on the specimens of Comparative Example 1 and Example 1 to Example 7 which had undergone the above-described steps. Hereinafter, evaluation methods thereof will be described.

(Evaluation of Insulation Characteristics After Heat Cycle of Excessive Increase in Temperature and Adhesiveness of Film)

First, the insulation resistances of the insulating coat films of the respective SiC heaters that were the specimens of Comparative Example 1 and Example 1 to Example 7 were measured using a mega tester, and, consequently, it was confirmed that all of the insulating coat films had a sufficient insulation resistance of 2 MΩ or more (under application of DC 500 V).

Next, in the SiC heaters of the respective specimens, the heating elements were heated from 100° C. to 800° C. for one second using a temperature adjuster and then forcibly cooled using a compressed air having an air pressure of 0.5 MPa. After that, whether or not there was any abnormality in the insulating coat films was visually confirmed, and then the insulation resistances of the insulating coat films were measured using a mega tester. A heat history of an excessive increase in temperature was repeated a maximum of five times, each time the heat history was repeated, the insulating coat films were visually confirmed, and the insulation resistances were measured. For specimens having a deteriorated insulation resistance, the heat history was ended at a point in time when the insulation resistance deteriorated. These measurement results are shown in Table 2.

TABLE 2

| Specimen | Before excessive increase in temperature | Number of times of excessive increase in temperature (100° C.→800° C.) | | | | |
|---|---|---|---|---|---|---|
| | | First time | Second time | Third time | Fourth time | Fifth time |
| Comparative Example 1 | ○ 2 MΩ or more | x 250 Ω or less | — | — | — | — |
| Example 1 | ○ 2 MΩ or more | ○ 2 MΩ or more | ○ 2 MΩ or more | ○ 2 MΩ or more | ○ 2 MΩ or more | ○ 2 MΩ or more |
| Example 2 | ○ 2 MΩ or more | ○ 2 MΩ or more | ○ 2 MΩ or more | ○ 2 MΩ or more | ○ 2 MΩ or more | ○ 2 MΩ or more |
| Example 3 | ○ 2 MΩ or more | ○ 2 MΩ or more | ○ 2 MΩ or more | ○ 2 MΩ or more | ○ 2 MΩ or more | ○ 2 MΩ or more |
| Example 4 | ○ 2 MΩ or more | ○ 2 MΩ or more | ○ 2 MΩ or more | ○ 2 MΩ or more | ○ 2 MΩ or more | Δ 2 MΩ or more |
| Example 5 | ○ 2 MΩ or more | ○ 2 MΩ or more | ○ 2 MΩ or more | ○ 2 MΩ or more | ○ 2 MΩ or more | Δ 2 MΩ or more |
| Example 6 | ○ 2 MΩ or more | ○ 2 MΩ or more | ○ 2 MΩ or more | Δ 2 MΩ or more | x 250 Ω or less | — |
| Example 7 | ○ 2 MΩ or more | ○ 2 MΩ or more | ○ 2 MΩ or more | x 250 Ω or less | — | — |

Note 1) Observation results of insulatiing films, ○: No abnormality, Δ: Somewhat white-turbid, x: Significantly white-turbid
Note 2) Measurement of insulation resistance using mega tester (under application of DC 500 V)

[Consideration]

In the specimen of Comparative Example 1, the insulation property after an excessive increase in temperature significantly degraded. In the specimen of Comparative Example 1, it was confirmed that the insulating coat film at a root portion of the slit of the heater became partially white-turbid after the excessive increase in temperature.

Meanwhile, the melting point of the insulating coat film of Comparative Example 1 was separately measured and turned out to be 844° C. From these results, it is considered that, in the specimen of Comparative Example 1, an electric current concentrated during the excessive increase in temperature, the insulating coat film reached the melting point particularly in a portion in which the temperature increased, the components changed, and the insulation property deteriorated.

On the other hand, in the specimens of Example 1 to Example 3, even after five times of the excessive increase in temperature, there was no change in the appearances of the insulating coat films, and the insulation resistances also did not deteriorate. The melting point of the insulating coat film of Example 1 was separately measured and turned out to be 943° C.

In addition, in Examples 4 and 5, even after five times of the excessive increase in temperature, the deterioration of the insulation resistance was not observed, but it was confirmed that the insulating coat films at the root portions of the slits of the heaters became slightly white-turbid.

From these results, it was confirmed that the insulating coat films of Example 1 and Example 3 included all of BaO, MgO, and CaO, and thus the melting points became sufficiently high, and the insulation properties could be ensured even in a case in which the excessive increase in temperature was carried out.

However, as observed in Examples 4 and 5, in a case in which either MgO or CaO was not included, it is considered that the adhesiveness of the insulating coat film to the silicon carbide surface slightly degrades, and thus, after five times of the excessive increase in temperature, peeling occurred in an interface of the insulating coat film, which made the insulating coat film observed to become white-turbid in some portions.

In Examples 6 and 7, after the third time of the excessive increase in temperature, the insulating coat films at the root portions of the slits of the heaters were observed to become white-turbid, and decreases in the insulation resistances were shown.

In the specimen of Example 6, BaO was not added to the insulating coat film. Therefore, the insulating coat film was not sticky and became brittle, and it is considered that the adhesiveness of the insulating coat film to the silicon carbide sintered body degraded. Therefore, peeling occurred in the interface between the silicon carbide sintered body and the insulating coat film, the insulating coat film appeared white-turbid in some portions, and it is assumed that, after the fourth time of the excessive increase in temperature, the insulation resistance also deteriorated.

In the specimen of Example 7, the proportion of the contents of MgO and CaO in the content of BaO in the insulating coat film was small. More specifically, the total of the contents of MgO and CaO was not in a range of equal to or more than and twice or less than the content of BaO. Therefore, it is considered that, compared to Examples 1 to 3 in which the total of the contents of the MgO and CaO was in the above-described range, in the specimen of Example 7, the thermal resistance of the insulating coat film decreased, and, at the third time of the excessive increase in temperature, the components of the insulating coat film changed, and the insulation property deteriorated.

INDUSTRIAL APPLICABILITY

The present invention relates to a SiC heater capable of rapid increase and decrease in temperature and is preferably used as a heater for semiconductor chip bonding which is used particularly in an assembly step of a semiconductor. The present invention is capable of providing a SiC heater in which the degradation of the insulation property by an excessive increase in temperature is suppressed.

REFERENCE SIGNS LIST

1 . . . HEATING ELEMENT
1A . . . SILICON CARBIDE SINTERED BODY
1B . . . INSULATING COAT FILM
2, 3 . . . SLIT
4, 5 . . . THROUGH-HOLE (FOR ELECTRODE ATTACHMENT)
6 . . . THROUGH-HOLE (FOR CHIP ADSORPTION)
7, 8 . . . THROUGH-HOLE (FOR HEAT EXCHANGER PLATE ADSORPTION)
9, 10 . . . GROOVE (FOR HEAT EXCHANGER PLATE ADSORPTION)
11, 12 . . . THROUGH-HOLE (FOR SUPPLYING VARIOUS GASES)
13, 14 . . . THROUGH-HOLE (FOR ATTACHMENT SCREW INSERTION)
15 . . . FLAT HEAD SCREW
21 . . . HEATER BASE 21a . . . COUNTERBORE PORTION
22 . . . COOLING SYSTEM CONNECTION MEMBER
24 . . . LEAD WIRE (WIRE)
26, 27 . . . GROOVE
28 . . . THROUGH-HOLE
29 . . . ELECTRODE ATTACHMENT HOLE
30 . . . HEAT EXCHANGER PLATE
31 . . . THROUGH-HOLE (FOR CHIP ADSORPTION)
32, 33 . . . THROUGH-HOLE (FOR SUPPLYING VARIOUS GASES)
35, 36 . . . THROUGH-HOLE (FOR HEAT EXCHANGER PLATE ADSORPTION ON GROOVE SIDE)
37, 38 . . . THROUGH-HOLE (FOR SUPPLYING COOLING GAS)
40 . . . SEMICONDUCTOR CHIP
50 . . . SUBSTRATE
60 . . . CONDUCTIVE BONDING MATERIAL
100 . . . SiC HEATER

The invention claimed is:

1. A SiC heater comprising:
a heating element comprising a thin plate-shaped silicon carbide sintered body and an insulating coat film formed on a surface of the silicon carbide sintered body;
a pair of electrodes for conducting electricity in the heating element; and
a heater base that holds the heating element from one surface side while blocking the heat from the heating element,
wherein the insulating coat film is located on a surface of the silicon carbide sintered body, the surface being on the reverse side of the heater base-side surface,
an electrical resistivity at room temperature of the insulating coat film is $10^9$ Ω·cm or more,
a thermal expansion coefficient of the insulating coat film is $2\times10^{-6}$/K or more and $6\times10^{-6}$/K or less,
the insulating coat film is consisting essentially of a matrix and first and second additive components added to the matrix,
the matrix is $SiO_2$,
the first additive component is one or both of $B_2O_3$ and $Al_2O_3$,
the second additive component is one, two or three of BaO, MgO and CaO and includes at least one of MgO and CaO,
a proportion of the first additive component is 1% by weight or more and 35% by weight or less of a total weight of the insulating coat film,
a proportion of the second additive component is 1% by weight or more and 35% by weight or less of the total weight of the insulating coat film.

2. The SiC heater according to claim 1,
wherein the second additive component includes both of MgO, and CaO.

3. The SiC heater according to claim 2,
wherein the second additive component includes all of BaO, MgO, and CaO.

4. The SiC heater according to claim 3,
wherein a total of contents of MgO and CaO of the second additive component is equal to or more than and twice or less than a content of BaO.

5. The SiC heater according to claim 1,
wherein a shape of the heating element is a substantial S shape in a plan view having two slits notched from two facing sides of a substantially square shape or a substantially rectangular shape in a plan view toward opposite sides respectively, and both end portions of the substantial S shape are respectively connected to the pair of electrodes.

6. The SiC heater according to claim 1,
wherein the insulating coat film is made of at least one of borosilicate glass or aluminosilicate glass.

7. The SiC heater according to claim 1,
wherein a proportion of the first additive component is 1% by weight or more and 30% by weight or less of the total weight of the insulating coat film.

8. The SiC heater according to claim 1,
wherein a sintered body density of the silicon carbide sintered body is 2.5 g/cm$^3$ or more, and an electrical resistivity at 25° C. is 0.1 Ω·cm or more and 100 Ω·cm or less.

9. The SiC heater according to claim 2,
wherein a shape of the heating element is a substantial S shape in a plan view having two slits notched from two facing sides of a substantially square shape or a substantially rectangular shape in a plan view toward opposite sides respectively, and both end portions of the substantial S shape are respectively connected to the pair of electrodes.

10. The SiC heater according to claim 2,
wherein the insulating coat film is made of at least one of borosilicate glass or aluminosilicate glass.

11. The SiC heater according to claim 2,
wherein a proportion of the first additive component is 1% by weight or more and 30% by weight or less of the total weight of the insulating coat film.

12. The SiC heater according to claim 2,
wherein a sintered body density of the silicon carbide sintered body is 2.5 g/cm$^3$ or more, and an electrical resistivity at 25° C. is 0.1 Ω·cm or more and 100 Ω·cm or less.

13. The SiC heater according to claim 3,
wherein a shape of the heating element is a substantial S shape in a plan view having two slits notched from two facing sides of a substantially square shape or a substantially rectangular shape in a plan view toward opposite sides respectively, and both end portions of the substantial S shape are respectively connected to the pair of electrodes.

14. The SiC heater according to claim 3, wherein the insulating coat film is made of at least one of borosilicate glass or aluminosilicate glass.

15. The SiC heater according to claim 3, wherein a proportion of the first additive component is 1% by weight or more and 30% by weight or less of the total weight of the insulating coat film.

16. The SiC heater according to claim 3, wherein a sintered body density of the silicon carbide sintered body is 2.5 g/cm$^3$ or more, and an electrical resistivity at 25° C. is 0.1 Ω·cm or more and 100 Ω·cm or less.

17. The SiC heater according to claim 4, wherein a shape of the heating element is a substantial S shape in a plan view having two slits notched from two facing sides of a substantially square shape or a substantially rectangular shape in a plan view toward opposite sides respectively, and both end portions of the substantial S shape are respectively connected to the pair of electrodes.

18. The SiC heater according to claim 4, wherein the insulating coat film is made of at least one of borosilicate glass or aluminosilicate glass.

19. The SiC heater according to claim 4, wherein a proportion of the first additive component is 1% by weight or more and 30% by weight or less of the total weight of the insulating coat film.

20. The SiC heater according to claim 4, wherein a sintered body density of the silicon carbide sintered body is 2.5 g/cm$^3$ or more, and an electrical resistivity at 25° C. is 0.1 Ω·cm or more and 100 Ω·cm or less.

* * * * *